No. 608,825. Patented Aug. 9, 1898.
G. G. BIEBER.
BICYCLE.
(Application filed Feb. 11, 1898.)
(No Model.)

WITNESS
Wm. C. McJennett.
L. M. Muller

INVENTOR
George G. Bieber
BY
Edgar Tate & Co
ATTORNEYS

UNITED STATES PATENT OFFICE.

GEORGE GODFREY BIEBER, OF PHILIPSBURG, MONTANA.

BICYCLE.

SPECIFICATION forming part of Letters Patent No. 608,825, dated August 9, 1898.

Application filed February 11, 1898. Serial No. 669,917. (No model.)

*To all whom it may concern:*

Be it known that I, GEORGE GODFREY BIEBER, a citizen of the United States, residing at Philipsburg, in the county of Granite and State of Montana, have invented certain new and useful Improvements in Bicycles, of which the following is a full and complete specification, such as will enable those skilled in the art to which it appertains to make and use the same.

This invention relates to an improvement in bicycles, and refers particularly to the driving mechanism thereof.

The object of the present invention is to provide a bicycle with driving mechanism independent of and supplemental to the usual foot-power mechanism.

The invention consists of certain novel features and details of construction and arrangement of parts hereinafter described, and defined in the claim.

The invention is fully disclosed in the following specification, of which the accompanying drawings form a part, in which the separate parts of my improvement are designated by the same letters of reference in each of the views, and in which—

Figure 1:
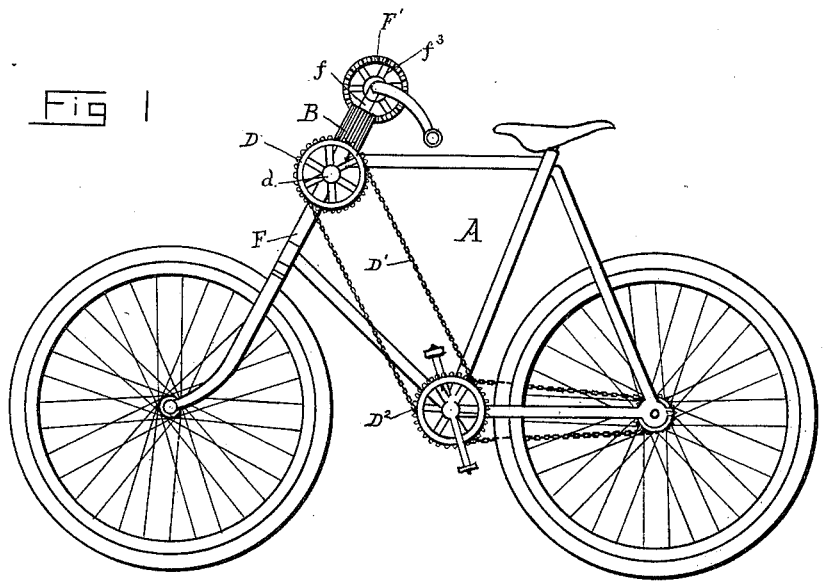
Figure 2:
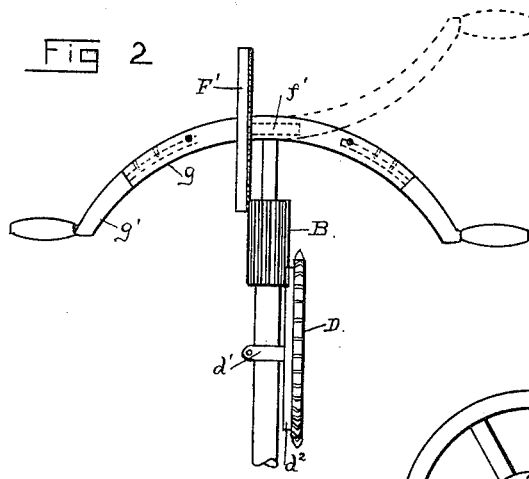
Figure 3:
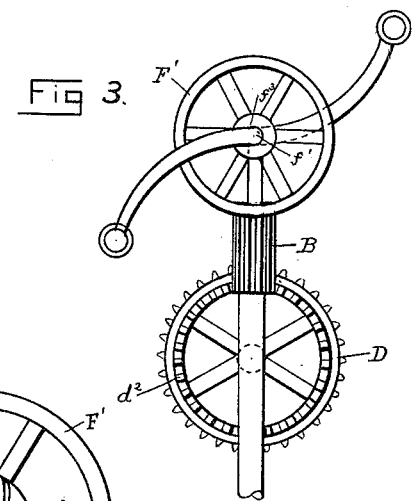
Figure 4:
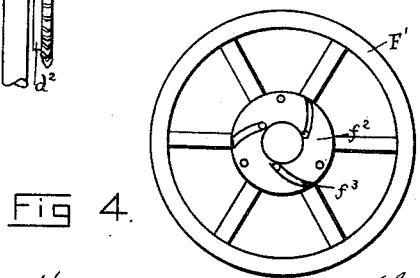

Figure 1 is a side view in elevation of a bicycle provided with my improvement. Fig. 2 is a front view of the main portion of my supplemental driving mechanism, parts being broken away. Fig. 3 is a side view of the same, and Fig. 4 is a view of a detail.

In the drawings, A represents an ordinary bicycle provided with the usual propelling mechanism. Upon the upper portion of the front fork of the frame is loosely sleeved a tubular pinion B. Beneath this pinion is arranged an adjustable shaft $d$, provided upon its inner end with a securing-clamp $d'$, adapted to be rigidly mounted upon said fork. A combined gear and sprocket wheel D is loosely sleeved upon the shaft $d$, and a sprocket-chain $D'$ leads from said sprocket wheel D to the sprocket-wheel $D^2$, mounted upon the pedal-shaft on the opposite side from the usual sprocket-wheel. The tension of the supplemental sprocket-chain can be adjusted by changing the vertical position of the clamp-shaft. The gear-teeth $d^2$ of the combined gear and sprocket D are arranged upon the inner face thereof and are adapted to mesh with the tubular pinion.

The main fork F is provided with an upwardly-extending standard $f$, in the upper end of which is sleeved a shaft $f'$, upon the outer ends of which are secured the handle-bars. A gear-wheel F' is loosely sleeved upon this shaft $f'$, and is arranged upon the side of the main fork opposite to the combined gear and sprocket wheel. This gear-wheel F' meshes with the upper portion of the tubular pinion B. The gear-wheel F' is provided with an annular recess or countersunk portion $f^2$, in which are arranged a plurality of grooves $f^3$, in which are spring-pressed dogs which are adapted to engage ratchet-teeth formed upon the central portion of the handle-shaft. A suitable cover-plate $f^3$ is secured over the annular recess and serves to hold the dogs and springs in place.

The handle-bars are each formed in two parts $g$ $g'$, the handle ends $g'$ of which are sleeved within the main portions and are revolubly secured therein by a pin-and-groove connection. Binding-screws are passed through the main portions, by which the handle portions are secured in their adjusted position.

From the above description it will be seen that the handle-bars may be rotated in a forward direction, whereupon by reason of the pawl-and-ratchet connection between said handle-bars and the gear rotation will be imparted to the combined gear and sprocket wheel and power thus transmitted to the pedal-sprocket and thence to the rear wheel, supplementing the usual driving mechanism. The construction permits the handle-bars to be held stationary when it is not desired to use the supplemental propelling mechanism.

Having fully described my invention, I claim as new and desire to secure by Letters Patent—

In a bicycle, the combination with the usual driving mechanism of a gear sleeved upon the handle-shaft and connected therewith by a pawl-and-ratchet mechanism, a tubular pinion sleeved upon the main fork and in mesh with said gear, a combined gear and sprocket wheel mounted on an adjustable shaft clamped about the main fork and in mesh with said tubular pinion, a supplemental sprocket-wheel mounted upon the pedal-shaft and a drive-chain connecting the said sprocket-wheels, substantially as and for the purpose set forth.

In testimony that I claim the foregoing as my invention I have signed my name, in presence of the subscribing witnesses, this 2d day of February, 1898.

GEORGE GODFREY BIEBER.

Witnesses:
  ALBERT RUPP,
  BERT TARR.